United States Patent Office 2,923,195
Patented Feb. 2, 1960

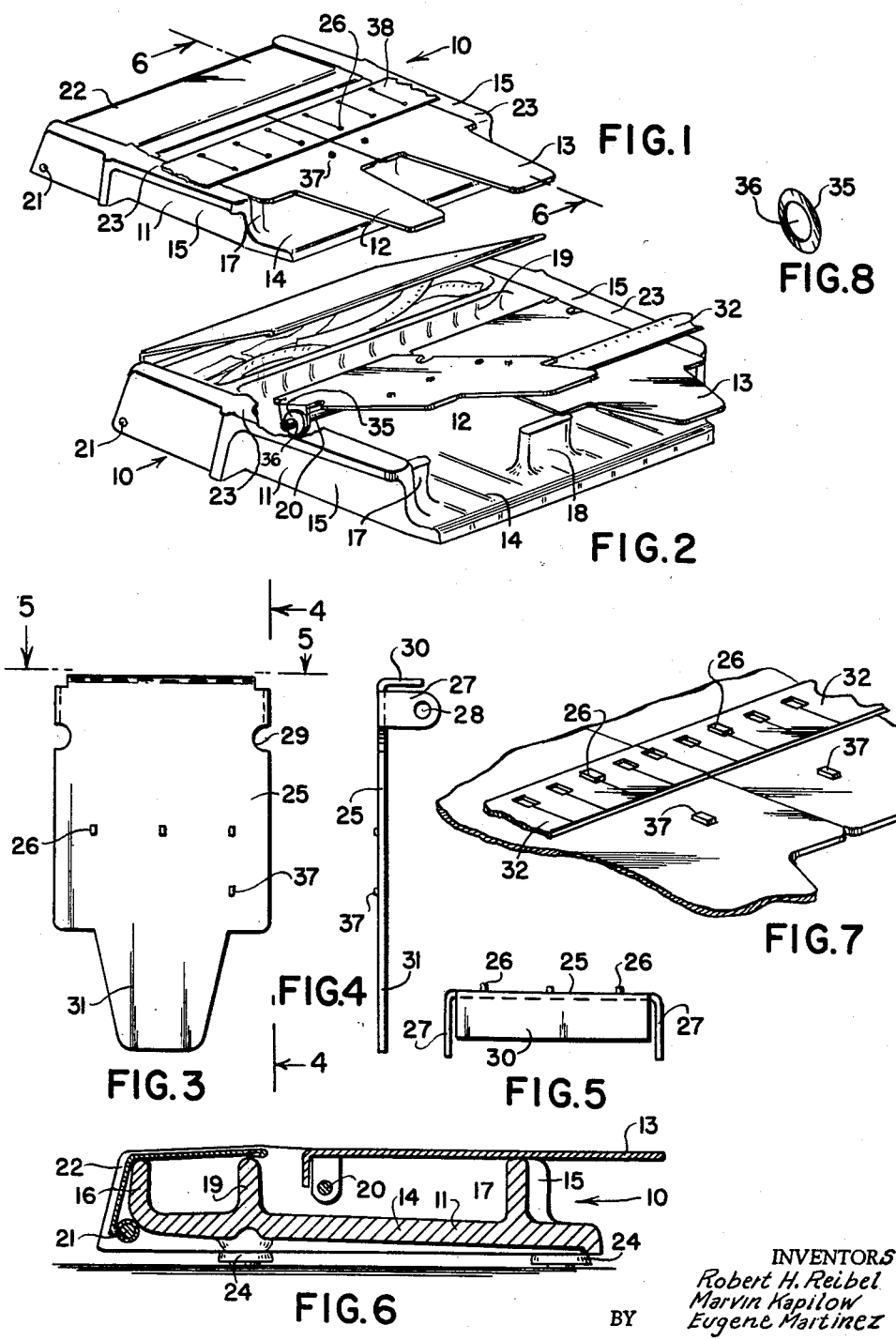

2,923,195

DEVICE FOR POSITIONING AND TRIMMING FILM LENGTHS FOR BUTT SPLICING

Robert H. Reibel, Croton-on-Hudson, Eugene Martinez, Bronx, and Marvin Kapilow, Croton-on-Hudson, N.Y.

Application February 4, 1958, Serial No. 713,210

4 Claims. (Cl. 83—607)

This invention relates to an apparatus and method for splicing film.

The splicing of consecutive frame film, of the movie and strip type, is an old art which down through the years has developed a vast amount of equipment to facilitate the operation of the various splicing methods. Originally, and in fact at present, the great majority of splicing was what is known as "overlap" splicing. This splice, as its name implies, embraces the overlapping of the end of one strip of consecutive frame film with the end of another such strip and securing, by means of cement or otherwise, the overlapped end portions in such position. This type of splice has presented a number of difficulties, some of which are directed to the final product and some to the method of achieving the splice. In forming an overlap splice, as above described, it is necessary to trim the film strips to be spliced, scrape the emulsion from the securing surfaces, align the strips and cement them in place. These steps are tedious when done by hand and devices adapted to facilitate them are complicated by many moving parts. Further, the final product is often unsatisfactory due to the poor light transmission character of the splice and the increased thickness of the film at the point of splice.

A second method is known as butt splicing and is directed to a process wherein the film strips to be spliced are trimmed through the center of a sprocket-receiving opening and are secured in end to end relation at such point. In this type of splice, the problems of poor light transmission at the splice are eliminated along with the nuisance of scraping the emulsion from the overlapped surfaces. New problems, however, have been encountered; such as accurately trimming and securing the film strips so that the required sprocket-receiving opening is correctly positioned between the strips in the splice. Devices of various types have been designed to facilitate butt splicing, but these are complicated and expensive. Further, the devices for butt splicing and overlap splicing are usually adapted to splice only one size film.

Recently, the splicing art has been advanced by the introduction of transparent pressure-sensitive adhesive tape as a substitute for the cements formerly used in securing splices. The splicing device of the instant invention overcomes the problems encountered in the prior art and enables a butt splice to be formed quickly, simply and with accuracy with pressure-sensitive tape of the above-indicated type.

It is therefore an object of the invention to provide an improved apparatus and method for positioning and trimming two lengths of consecutive frame film and for butt splicing them together.

It is also an object of the invention to provide a device for aligning two lengths of consecutive frame film and trimming their adjacent ends such that they abut, with at least one sprocket-receiving opening being formed therebetween.

It is another object of the invention to provide a device of relatively simple structure, having a limited number of movable parts, which is adapted, with a minimum of waste movement, to trim the strips of film to be spliced and to retain such strips in splicing position during the securing operation.

It is further an object of the invention to provide a device for use in trimming and butt splicing either 8 mm. or 16 mm. film, such device not requiring alteration to accommodate said different size film.

It is a still further object of the invention to provide a device to facilitate the trimming and butt splicing of film which may readily be manufactured by quantity production methods and is of such rugged character that it will function over a long period of time with freedom from all difficulties.

With these and other objects in mind, reference is had to the attached sheet of drawings, illustrating one form of the invention, wherein like characters represent like parts, and in which:

Fig. 1 is a perspective view illustrating the butt splicing device;

Fig. 2 is a perspective view partially broken away showing the butt splicing device in position preparatory to trimming a film strip;

Fig. 3 is a plan view illustrating, in detail, one of the cutting and mounting plates of the invention;

Fig. 4 is a side view taken in the direction of the arrows 4—4 in Fig. 3;

Fig. 5 is an elevated end view taken in the direction of the arrows 5—5 in Fig. 3;

Fig. 6 is a cross-sectional view of the butt splicing device taken in the direction of the arrows 6—6 in Fig. 1;

Fig. 7 is an enlarged fragmentary perspective view illustrating two trimmed film strips mounted on the device preparatory to forming the butt splice; and Fig. 8 is an enlarged perspective view of a resilient washer that may be used to urge the mounting plates into abutting relation.

Our invention contemplates the provision of a pair of film supporting and trimming plates, each presenting a film supporting surface and a film cutting edge at one end thereof with the plates shiftably supported in a normal film splicing position with the film supporting surfaces in substantially the same plane as each other and with the cutting edges in abutting relationship and so that the plates may be independently and selectively shifted out of said plane in a direction substantially at right angles thereto. Film strips are fixedly supported and positioned on said film supporting surfaces in substantially the same plane and in coaxial relationship so that their projecting ends overlap the abutting cutting edges. By separately moving the plates out of and into their normal splicing positions, the projecting ends of the film can be separately cut by the same cutting edges to provide complementary film end portions which are retained in abutting relation while they are butt spliced together.

Referring now to the drawings for a more detailed explanation of the butt splicing device, which is generally indicated by the numeral 10, a base portion 11 is shown which pivotally mounts two film cutting and mounting elements or plates 12 and 13. The base portion 11, which may conveniently be cast or formed in any other manner familiar to the art, includes a bottom wall 14, upwardly-extending side walls 15 and an upwardly-extending back wall 16. Reinforcing ribs 17 are formed integral with the ends of walls 15 directed away from back wall 16. A post 18 extends upwardly from bottom wall 14 between side walls 15 to provide support for plates 12 and 13. Ribs 17 are preferably slightly lower in height than post 18 and serve as auxiliary supports for plates 12 and 13 in the event that excessive force in a downward direction is applied thereto. A rod is secured between side walls 15 in any manner known to the art, for pivotally retaining elements 12 and 13 in association with base portion 11. Extending between side walls 15 and spaced from and parallel to back wall 16 is a partitioning wall 19 which serves to form a trough for a purpose to be hereinafter described. A cover retaining rod 21 is secured between side walls 15 outwardly of back wall 16 and pivotally mounts thereon a substantially L-shaped cover member 22 of sheet metal or similar lightweight material. The cover member is adapted to pivot around rod 21 to cover or uncover the trough, formed between back wall 16 and partitioning wall 19, as desired. The trough serves to store patches of transparent pressure-sensitive adhesive tape or any other materials necessary to the formation of a completed splice.

In the embodiment of the device, here illustrated, flange portions 23 are provided integral with the upper edges of walls 15. These flanges serve to enlarge the working surface of the splicing device and to reinforce the base portion 11. Rubber or similar support feet 24 (Fig. 6) may be provided on base portion 11 to support the same and to eliminate the possibility of marring the surface on which splicing device is used. It is, of course, obvious that the structure of the base portion may be changed in a variety of ways without substantially altering the functional character of the device.

The film cutting and supporting plates 12 and 13 which are best illustrated in Figs. 3 to 5 are identical in structure and therefore only one of them will be described. Each of the plates, which may conveniently be stamped from sheet metal or formed in any other manner known to the art, includes a body portion 25 of substantially rectangular configuration having formed thereon spaced registration pins 26 which are adapted to engage with the sprocket-receiving openings in the film to be employed.

The spacing of the pins 26 will depend on the spacing of the sprocket-receiving opening of the film. In the case of the most popular home movie film, 8 mm. and 16 mm., the spacing of the distance between the sprocket openings on the 16 mm. film is a multiple of the spacing between the sprocket openings on the 8 mm. film—namely 2 times. In the illustrated embodiment, the pins 26 are spaced apart a distance based upon the distance between the sprocket openings of the 16 mm. film and thus the splicer can accommodate both 8 mm. and 16 mm. film.

In addition to the pins 26, we also provide pins 37—preferably one on each plate—which serve to accommodate apertures in one type of pressure-sensitive splicing tape now commercially available and disclosed in our copending patent application Serial No. 688,855, filed October 8, 1957, for "Splice Patch and Method."

Depending wings 27, formed with openings 28 for engagement with rod 20 on base portion 11, are formed integral with body portion 25. To facilitate the formation of wings 27, notches 29 are provided in the body portion. A depending flange 30 for reinforcing body portion 25 is formed integral therewith adjacent the end of said body portion on which wings 27 are formed. An arm or finger gripping portion 31 is formed integral with body portion 25 to form an operating handle at the end directed away from flange 30.

In mounting elements 12 and 13 on base portion 11, the rod 20 is inserted through the openings 28 in wings 27 and is secured between the side walls 15 of said base portion to pivotally retain the elements in association therewith. On thus mounting the elements, the plates 12 and 13 are supported at their ends directed away from flange 30 by support 18. Thus being supported, the upper surface of the elements lie in the same plane as the upper surface of flanges 23 and the adjacent edges abut to provide a continuous working surface for use during the formation of a butt splice.

Resilient or spring means are preferably provided to urge the plates 12 and 13 into abutting relation. This means may take any desired form, such as the spring washers 35 having apertures 36 assembled around rod 20 between the side walls 15 of the base and the depending wings 27 of the plates. The washers are made of a suitable resilient metal and are concavo-convex preferably in one dimension only. One washer presses against the outer wing 27 of each plate with the convex surface of the washer engaging the wing to provide a good bearing surface. Because the abutting cutting edges of the plates are thus resiliently urged towards each other, we have found that it is not necessary to sharpen or grind these edges—although it should be understood that the edges may be ground if desired.

In utilizing the splicing device 10 of the instant invention, a film strip 32, as shown in Fig. 2, is mounted on one of the film cutting and mounting plates (plate 13) to extend past the cutting edges. Plate 12 is pivoted upwardly around rod 20, out of plane with plate 13 and is then pivoted back into plane therewith to trim the portion of film strip 32 which extends past the cutting edges. Similarly, a film strip is mounted on plate 12 to overlap the cutting edges and the plate 13 is then pivoted upwardly and downwardly to trim the end portion of that film strip. The two strips have thus been cut or trimmed by the same cutting edges, providing complementary splicing ends that are held in abutting relation, ready for butt splicing by the same pins 26 on plates 12 and 13, which held them while they were trimmed.

As previously pointed out, the pins 26 are so spaced in the illustrated embodiment to accommodate either 8 mm. or 16 mm. film. In Fig. 7 we have illustrated the preferred arrangement of 8 mm. film on the plates with the sprocket holes placed over pins 26 and with the body of the film projecting towards the free end of the plates. In splicing 16 mm. film, it is preferably arranged in opposite relationship on the plates, namely with one set of sprocket holes in engagement with pins 26 and with the body of the film projecting towards the hinged end of the plates, as shown at 38 in Fig. 1.

After the film strips have been trimmed and retained in splicing position, they may conveniently be secured together, by applying to adjacent surfaces thereof, transparent pressure-sensitive adhesive tape, of the type previously mentioned, or by any other means known to the art. If the pressure-sensitive splicing patch shown in our above-mentioned patent application is employed in splicing 8 mm. film, the apertures therein may conveniently be engaged with pins 26 and 37 while applying the patch to the first side of the film.

Thus, among others, the several objects of the invention as aforenoted are achieved. Obviously, numerous changes in construction may be resorted to without departing from the spirit of the invention as defined by the claims.

In this connection our improved splicing device may be adapted for use with films of other types and sizes, such as 35 mm. film by arranging the pins 26 so as to fit the sprocket opening therein. Where the apparatus is adapted for professional use with 35 mm. film, it may, of course, be of heavier and stronger construction.

We claim:

1. Apparatus for use in the butt splicing of a pair of film strips with a splice patch comprising a pair of film strip supporting and trimming plates, each of said plates presenting a film strip supporting surface and a film strip cutting edge, the cutting edge of each of said plates being in substantially contiguous relationship with respect to one another, aligned and spaced registration pins projecting from the supporting surface of each of said plates for engaging with sprocket receiving openings in film strips to be spliced and for fixedly supporting and positioning such film strips on the respective supporting surfaces in aligned relationship so that projecting ends of such film strips extend beyond the cutting edge of its supporting plate, support means for pivotally supporting each of said plates between a normal film strip splicing position with the film supporting surface of each plate in substantially the same plane and with the film strip cutting edge of each plate in substantially contiguous relationship and a second position at an angle to said plane, each of said plates including a finger gripping portion for effecting the manual pivoting of each plate independently and selectively between said normal position and second position in a direction at right angles to said plane whereby the projecting ends of the film strip can be trimmed by the selective pivoting of said plates between said second position and said normal position to thereby present complementary trimmed ends of said film strips, which trimmed ends are adapted to be butt spliced together by a splice patch while the film strips are on the respective supporting surfaces in said aligned relationship and with each of said plates in said normal position.

2. The invention in accordance with claim 1 wherein resilient means are interposed between one of said plates and said support means for urging said plates towards one another.

3. The invention in accordance wtih claim 1 wherein said registration pins are so spaced and arranged that they are cooperable to fixedly support and position 16 mm. film strips on the film supporting surfaces in aligned relationship and are cooperable to fixedly support and position 8 mm. film strips on the film supporting surfaces in aligned relationship.

4. The invention in accordance with claim 1 wherein both of said plates include another registration pin projecting from the respective film supporting surface adjacent the respective cutting edge and being spaced from the respective spaced registration pins for engagement with openings in a splice patch and for cooperating to fixedly support and position said splice patch relative to said film strips and said supporting surfaces.

References Cited in the file of this patent

UNITED STATES PATENTS

| | | |
|---|---|---|
| 2,367,330 | Bolsey | Jan. 16, 1945 |
| 2,842,184 | Manchester | July 8, 1958 |